US012122170B2

(12) United States Patent
Minami et al.

(10) Patent No.: US 12,122,170 B2
(45) Date of Patent: Oct. 22, 2024

(54) PRINTER, PRINTING METHOD, AND NON-TRANSITORY COMPUTER-READABLE STORAGE MEDIUM STORING PRINTING PROGRAM

(71) Applicant: BROTHER KOGYO KABUSHIKI KAISHA, Nagoya (JP)

(72) Inventors: Akira Minami, Nagoya (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/332,687

(22) Filed: Jun. 9, 2023

(65) Prior Publication Data

US 2023/0398790 A1 Dec. 14, 2023

(30) Foreign Application Priority Data

Jun. 10, 2022 (JP) ................................ 2022-094400

(51) Int. Cl.
*B41J 2/355* (2006.01)
*B41J 35/16* (2006.01)

(52) U.S. Cl.
CPC ............... *B41J 2/355* (2013.01); *B41J 35/16* (2013.01)

(58) Field of Classification Search
CPC ..... B41J 2/355; B41J 35/16; B41J 2/32; B41J 2/36; B41J 2/525; B41J 35/18; B41J 2002/0052; B41F 16/00; B41F 16/0006
See application file for complete search history.

(56) References Cited

U.S. PATENT DOCUMENTS

| | | | | |
|---|---|---|---|---|
| 5,661,512 A * | 8/1997 | Fukuda | B41J 2/36 | 347/186 |
| 2004/0135869 A1* | 7/2004 | Verdyck | B41J 2/355 | 347/182 |
| 2011/0018951 A1* | 1/2011 | Muraki | B41J 2/355 | 347/192 |
| 2018/0178547 A1* | 6/2018 | Murakami | B41J 11/42 | |
| 2021/0141328 A1 | 5/2021 | Sasaki et al. | | |

FOREIGN PATENT DOCUMENTS

| | | |
|---|---|---|
| JP | 2008-6830 A | 1/2008 |
| JP | 2019-214206 A | 12/2019 |
| WO | 02/096665 A1 | 12/2002 |

* cited by examiner

*Primary Examiner* — Kristal Feggins
(74) *Attorney, Agent, or Firm* — KENEALY VAIDYA LLP

(57) ABSTRACT

A printer performs printing on a thermosensitive medium including a plurality of color developing layers including a first layer developing a first color and a second layer developing a second color. The printer includes a head and a control device performing a printing control including outputting a signal pattern based on post-conversion image data converted from pre-conversion image data to cause a plurality of heat generation elements of the head to selectively generate heat while controlling conveyance of the thermosensitive medium. In the converting, when target dots containing the second color is included in the plurality of dots in the pre-conversion image data, the control device converts a color of conversion dots to a conversion color containing the color developed by any one of the plurality of color developing layers.

17 Claims, 8 Drawing Sheets

| CONVERSION TABLE | | | | | | | |
|---|---|---|---|---|---|---|---|
| | | TARGET DOT | | | | | |
| | | R | M | B | C | G | K |
| CONVERSION DOT (UPSTREAM DOT) | Y | – | – | – | – | – | – |
| | R | – | – | – | – | – | – |
| | M | – | – | – | – | – | – |
| | B | – | – | – | – | – | – |
| | C | – | – | – | – | – | – |
| | G | – | – | – | – | – | – |
| | K | – | – | – | – | – | – |
| | W | R | M | B | C | G | K |

| CONVERSION TABLE | | | | | | | |
|---|---|---|---|---|---|---|---|
| | | TARGET DOT | | | | | |
| | | R | M | B | C | G | K |
| CONVERSION DOT | Y | X1 | X9 | X16 | G | X29 | X36 |
| | R | X2 | X10 | X17 | X24 | X30 | X37 |
| | M | X3 | X11 | X18 | B | X31 | X38 |
| | B | X4 | X12 | X19 | X25 | X32 | X39 |
| | C | X5 | X13 | X20 | X26 | X33 | X40 |
| | G | X6 | X14 | X21 | X27 | X34 | X41 |
| | K | X7 | X15 | X22 | X28 | X35 | X42 |
| | W | X8 | B | X23 | B | C | X43 |

PRINTER, PRINTING METHOD, AND NON-TRANSITORY COMPUTER-READABLE STORAGE MEDIUM STORING PRINTING PROGRAM

REFERENCE TO RELATED APPLICATIONS

This application claims priority from Japanese Patent Application No. 2022-94400 filed on Jun. 10, 2022. The entire content of the priority application is incorporated herein by reference.

BACKGROUND ART

There is a printer that performs printing on a thermosensitive medium in which a plurality of color developing layers with different developed colors are formed on a base material. For example, a related-art image forming device applies energy from a print head to a thermosensitive medium having three color developing layers with different color developing characteristics, and controls the temperature and time of the print head at that time to print dots on a desired color developing layer.

In the above-described related-art image forming device, when printing on a thermosensitive medium, high-temperature heating for a short time is required so as to allow the upper color developing layer to develop colors, and low-temperature heating for a long time is required so as to allow the lower color developing layer to develop colors. At this time, when the printing speed is increased, the printing period will be shortened, so that it is difficult to secure the time required so as to allow the lower color developing layer to develop colors. Therefore, in the image forming device, there is a possibility that the size of the dots actually printed on the thermosensitive medium may be smaller than the target size.

DESCRIPTION

Illustrative aspects of the present disclosure provide a printer, a printing method, and a printing program that contribute to an advantage of suppressing a size of dots actually printed on a thermosensitive medium from being smaller than a target size.

A printer according to a first aspect of the present disclosure is a printer configured to perform printing on a thermosensitive medium, the thermosensitive medium including a base material and a plurality of color developing layers that are layers stacked on the base material in a stacking direction and that develop colors in accordance with energy applied, the plurality of color developing layers including: a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer including: a conveyance device configured to convey the thermosensitive medium in a conveyance direction; a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction; and a control device configured to: receive pre-conversion image data; convert the received pre-conversion image data to post-conversion image data; and perform a printing control including outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device. The pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively. In the converting, in a case target dots that are dots of a color containing the second color is included in the plurality of dots in the pre-conversion image data, the control device is configured to convert a color of conversion dots to a conversion color containing a color developed by any one of the plurality of color developing layers, the conversion dots being at least one of dots among a pair of first dots adjacent to the target dots in the sub-scanning direction, a pair of second dots adjacent to the target dots in the main-scanning direction, and four third dots adjacent to each of the pair of second dots in the sub-scanning direction.

According to the first aspect, since the control device converts the color of the conversion dots to the conversion color in the converting, the control device controls the thermal head and the conveyance device so as to print the conversion dot of the conversion color on the thermosensitive medium in the performing of the printing control. The conversion dots are at least one of the pair of first dots, the pair of second dots, and the four third dots. Therefore, the printer contributes to the advantage of suppressing the size of the target dots actually printed on the thermosensitive medium from being smaller than the target size.

A printing method according to a second aspect is a printing method by a printer, the printer being configured to perform printing on a thermosensitive medium, the thermosensitive medium including a base material and a plurality of color developing layers that are layers stacked on the base material in a stacking direction and that develop colors in accordance with energy applied, the plurality of color developing layers including: a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer including: a conveyance device configured to convey the thermosensitive medium in a conveyance direction; and a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction, the printing method including: obtaining pre-conversion image data; converting the pre-conversion image data obtained in the obtainment process to post-conversion image data; and performing a printing control including outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device. The pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively. In the converting, in a case target dots that are dots of a color containing the second color is included in the plurality of dots in the pre-conversion image data, the method includes converting a color of conversion dots to a conversion color containing a color developed by any one of the plurality of color developing layers, the conversion dots being at least one of dots among a pair of first dots adjacent to the target dots in the sub-scanning direction, a pair of second dots adjacent to the target dots in the main-scanning direction, and four third dots adjacent to each of the pair of second dots in the sub-scanning direction. The second aspect can obtain the same effect as the first aspect.

A non-transitory computer-readable storage medium according to a third aspect is a non-transitory computer-readable storage medium storing a printing program readable by a computer of a printer, the printer being configured to perform printing on a thermosensitive medium, the thermosensitive medium including a base material and a plurality of color developing layers that are layers stacked on the base material in a stacking direction and that develop colors in accordance with energy applied, the plurality of color developing layers including: a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer including: a conveyance device configured to convey the thermosensitive medium in a conveyance direction; and a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction, the printing program, when executed by the computer, causing the printer to perform operations including: receiving pre-conversion image data; converting the received pre-conversion image data to post-conversion image data; and performing a printing control including outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device. The pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively. In the converting, in a case target dots that are dots of a color containing the second color is included in the plurality of dots in the pre-conversion image data, the printing program, when executed by the computer, further cause the computer to perform converting a color of conversion dots to a conversion color containing a color developed by any one of the plurality of color developing layers, the conversion dots being at least one of the dots among a pair of first dots adjacent to the target dots in the sub-scanning direction, a pair of second dots adjacent to the target dots in the main-scanning direction, and four third dots adjacent to each of the pair of second dots in the sub-scanning direction. The third aspect can obtain the same effect as the second aspect.

Figure 1:
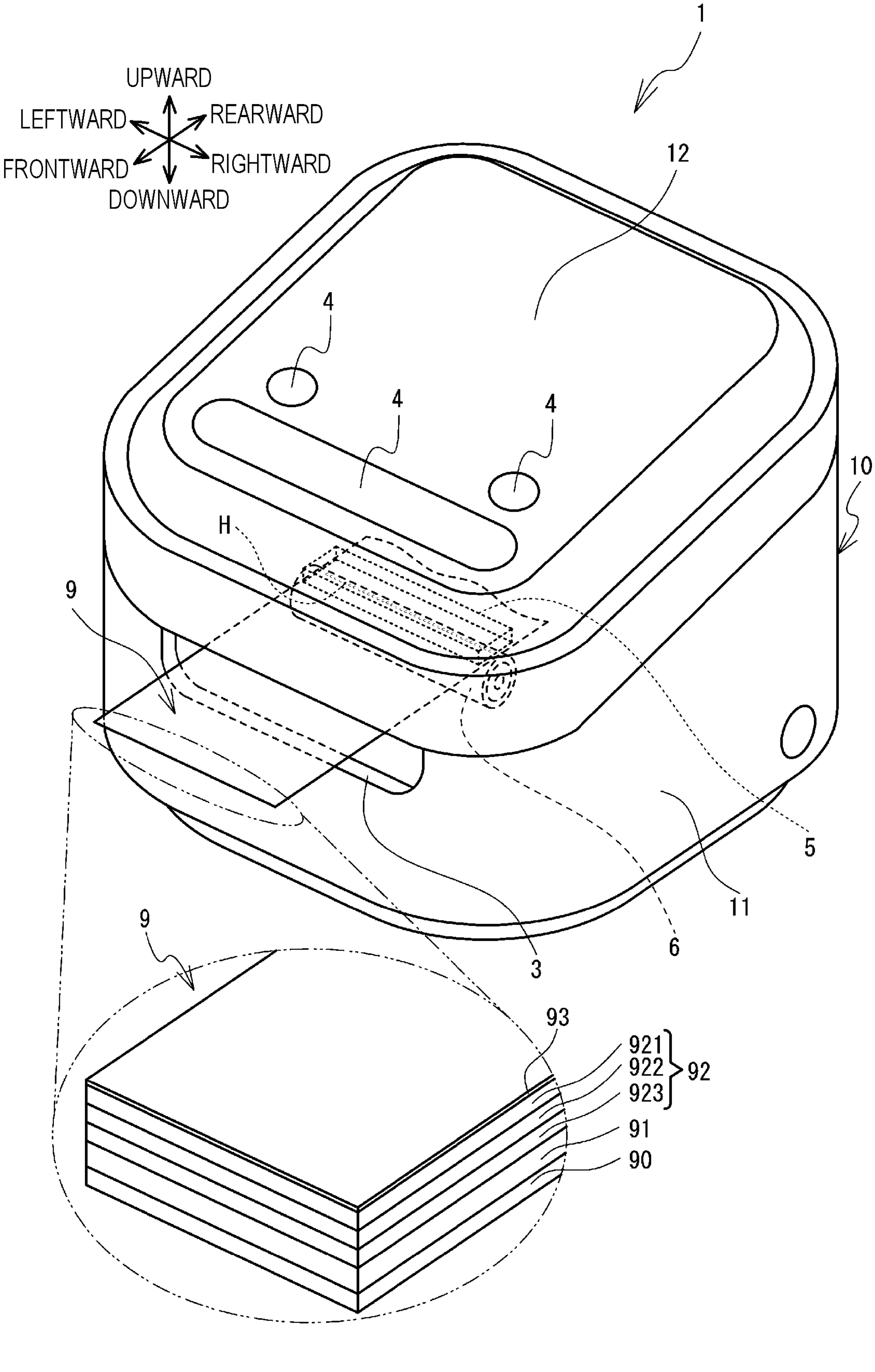
FIG. 1 is a perspective view illustrating a printer 1.

An illustrative embodiment specifying the present disclosure will be described below with reference to the drawings. The drawings to be referred to are used to illustrate technical features that can be employed by the present disclosure, and configurations, control, and the like of devices described are not meant to be limited to the configurations, control, and the like of the devices, but are merely illustrative examples. In the following description, the lower left, upper right, lower right, upper left, upper, and lower sides of FIG. 1 are forward, backward, rightward, leftward, upward, and downward sides of a printer 1 and a thermosensitive tape 9, respectively.

The printer 1 will be described with reference to FIG. 1. The printer 1 is a thermal-tape-type printer and prints an image on the thermosensitive tape 9. The thermosensitive tape 9 is a type of a thermosensitive medium. It is noted that, in this illustrative embodiment, "to print" denotes to allow a color developing layer 92 described later to develop colors. The printer 1 has a housing 10. The housing 10 has a box shape and includes a lower case 11 and a lid 12. The lower case 11 opens upward. The lid 12 opens and closes with respect to the lower case 11. FIG. 1 illustrates a state where the lid 12 is closed with respect to the lower case 11.

A discharge port 3 is provided on the front surface of the housing 10. The discharge port 3 discharges the printing-completed thermosensitive tape 9 from the inside of the housing to the outside. A plurality of operation switches 4 are provided on the upper surface of the housing 10. A user inputs various information to the printer 1 by operating each operation switch 4.

A mounting portion (not illustrated), a platen roller 6, and a thermal head 5 are provided in the housing 10. FIG. 1 illustrates the platen roller 6 and the thermal head 5 hidden by the housing 10 in virtual lines. The mounting portion is recessed downward from the upper surface of the lower case 11. The thermosensitive tape 9 is mounted on the mounting portion. In this illustrative embodiment, a tape cassette (not illustrated) is mounted on the mounting portion in a state where the thermosensitive tape 9 is housed in the tape cassette.

The platen roller 6 is located on the backward side of the discharge port 3 and extends in the left-right direction. The platen roller 6 conveys the thermosensitive tape 9 from the mounting portion toward the discharge port 3 by rotating. Therefore, in this illustrative embodiment, the forward-backward direction is the conveyance direction.

The thermal head 5 has a plate shape and faces the platen roller 6 from the above. The thermal head 5 interposes the thermosensitive tape 9 between the thermal head 5 and the platen roller 6 with the thickness direction of the thermosensitive tape 9 equal to the vertical direction of the printer 1.

The thermal head 5 has a plurality of heat generation elements H. The plurality of heat generation elements H are aligned in the left-right direction on the lower surface of the thermal head 5. That is, the direction (left-right direction) in which the plurality of heat generation elements H are aligned is perpendicular to the conveyance direction (forward-backward direction). The plurality of heat generation elements H perform printing on the thermosensitive tape 9 by generating heat.

The thermosensitive tape 9 will be described with reference to the enlarged view in FIG. 1. The thermosensitive tape 9 has an elongated shape and is configured with a plurality of stacked layers. It is noted that, in the enlarged view in FIG. 1, the thickness of each layer of the thermosensitive tape 9 and the size relationship of the thicknesses of respective layers are schematically illustrated for easy understanding, and in some cases, the actual thickness of each layer and the size relationship of the thicknesses of respective layers are different from those in FIG. 1.

The thermosensitive tape 9 has a release paper 90, a base material 91, a plurality of color developing layers 92, and an overcoat layer 93. In this illustrative embodiment, the plurality of color developing layers 92 include a first color developing layer 921, a second color developing layer 922, and a third color developing layer 923. The release paper 90, the base material 91, the third color developing layer 923, the second color developing layer 922, the first color developing layer 921, and the overcoat layer 93 are stacked in this order from the lower side of the thermosensitive tape 9 in the thickness direction of the thermosensitive tape 9.

In the following, the thickness direction of the thermosensitive tape 9 (up-down direction in FIG. 1) is also referred to as "stacking direction". Among the plurality of color developing layers 92 in the stacking direction, the layer disposed at the farthest position from the base material 91 is referred to as an "uppermost layer". Among the plurality of color developing layers 92 in the stacking direction, the layer disposed at the closest position to the base material 91 is referred to as a "lowermost layer". Among the plurality of color developing layers 92 in the stacking direction, the layer disposed between the uppermost layer and the lowermost layer is referred to as an "intermediate layer". In this illustrative embodiment, the first color developing layer 921 is the uppermost layer, the third color developing layer 923 is the lowermost layer, and the second color developing layer 922 is the intermediate layer.

The base material 91 is a resin film and has a base material color. Although the base material color is not limited to a specific color, the base material color is white in this illustrative embodiment. The base material color is different from any of the colors developed by the plurality of color developing layers 92 (first, second, and third colors described later in this illustrative embodiment). An adhesive surface is formed on the lower surface of the base material 91.

The release paper 90 is provided on the lower surface (adhesive surface) of the base material 91 and can be peeled off from the base material 91. After printing on the thermosensitive tape 9, the user can peel off the release paper 90 from the base material 91 and stick the printing-completed thermosensitive tape 9 to a desired location via the adhesive surface. The overcoat layer 93 is transparent to visible light and protects the plurality of color developing layers 92.

Each of the plurality of color developing layers 92 is transparent to visible light, and when heated to a color developing temperature corresponding to each layer, develops a color corresponding to each layer. For forming the plurality of color developing layers 92, for example, chemicals described in JP2008-6830A are used.

The first color developing layer 921 develops the first color when the temperature of the first color developing layer 921 exceeds a first temperature. That is, the first color is a color that is developed by the uppermost layer. The first color is not limited to a specific color, but is yellow in this illustrative embodiment.

The second color developing layer 922 develops the second color when the temperature of the second color developing layer 922 exceeds a second temperature. That is, the second color is a color developed by the intermediate layer. The second temperature is lower than the first temperature. The second color is not limited to a specific color, but is a color different from the first color, and is magenta in this illustrative embodiment.

The third color developing layer 923 develops the third color when the temperature of the third color developing layer 923 exceeds a third temperature. That is, the third color is a color developed by the lowermost layer. The third temperature is lower than the second temperature. The third color is not limited to a specific color, but is a color different from both the first color and the second color, and is cyan in this illustrative embodiment.

In the following, the base material color, the first color, the second color, and the third color are described as white, yellow, magenta, and cyan, respectively. When one dot is printed on the thermosensitive tape 9 and two or more of the plurality of color developing layers 92 are colored, the color of the one dot has a mixed color. In this illustrative embodiment, the mixed color is a color in which at least two of yellow, magenta, and cyan are mixed. For example, a mixed color of yellow and magenta is red. A mixed color of yellow and cyan is green. A mixed color of magenta and cyan is blue. A mixed color of yellow, magenta, and cyan is black.

In the following, when "a mixed color of a specific color and one or a plurality of other colors" and "single color of a specific color" are collectively referred to as, or when neither is specified, a "color containing a specific color" is referred to as. For example, "colors containing yellow" are collective colors or any one color of "red" (mixed color of yellow and magenta), "green" (mixed color of yellow and cyan), "black" (mixed color of yellow, magenta, and cyan), and "yellow" (single color of yellow). In addition, in some cases, cyan, magenta, yellow, black, red, green, blue, and white may be respectively abbreviated as "C", "M", "Y", "K", "R", "G", "B", and "W".

The printing operation on the thermosensitive tape 9 by the printer 1 will be described. In the printing operation, the platen roller 6 rotates counterclockwise when viewed from the right side surface to convey the thermosensitive tape 9 from the backward side to the forward side. The thermosensitive tape 9 is pressed against the thermal head 5 by the platen roller 6 while passing between the thermal head 5 and the platen roller 6. Specifically, the platen roller 6 comes into contact with the thermosensitive tape 9 from the release paper 90 side, and the thermal head 5 comes into contact with the thermosensitive tape 9 from the overcoat layer 93 side.

In this state, a voltage is selectively applied to each of the plurality of heat generation elements H. By energization, power is supplied to the heat generation elements H to which the voltage is applied. The heat generation element H supplied with power generates heat to heat the thermosensitive tape 9 conveyed by the platen roller 6 from the uppermost layer (first color developing layer 921) side in the stacking direction. Accordingly, the dots are printed on a heated position on the thermosensitive tape 9.

In the following, a line of the dots printed on the thermosensitive tape 9 by the plurality of heat generation elements H when the plurality of heat generation elements H are energized for one printing period is referred to as a "print line". One printing period is a period of time during which each of the plurality of heat generation elements H can be energized so as to print one line of the print lines on the thermosensitive tape 9 by the plurality of heat generation elements H. Since the plurality of heat generation elements H are aligned in the left-right direction, the print line extends in the left-right direction.

The printer 1 repeats printing the print line on the thermosensitive tape 9 while conveying the thermosensitive tape 9 (that is, energizes the heat generation element H for one printing period), to print a plurality of the print lines on the thermosensitive tape 9 along the conveyance direction. The platen roller 6 further rotates to discharge the printing-completed thermosensitive tape 9 from the discharge port 3 to the outside of the housing 10.

Figure 2:
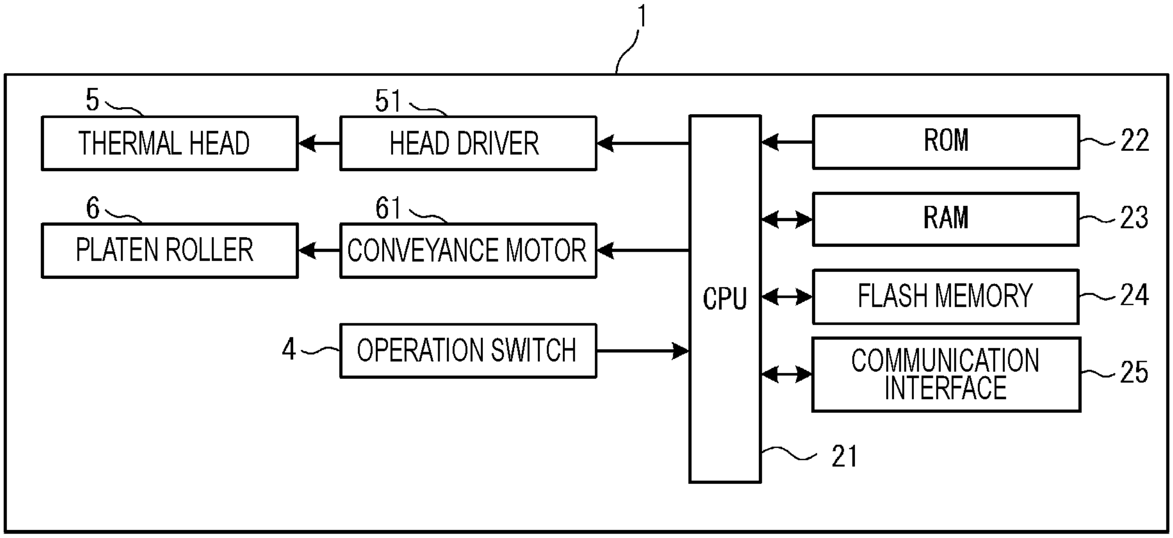
FIG. 2 is a block diagram illustrating an electrical configuration of the printer 1.

The electrical configuration of the printer 1 will be described with reference to FIG. 2. The printer 1 has a CPU 21. The CPU 21 controls the printer 1 and functions as a processor. The CPU 21 is electrically connected to a ROM 22, a RAM 23, a flash memory 24, a communication interface 25, the operation switch 4, a head driver 51, and a conveyance motor 61.

The ROM 22 stores various programs executed by the CPU 21, various parameters required when the CPU 21 executes the various programs, and the like. The ROM 22 stores, for example, a program for executing a main process described later (refer to FIG. 8), the signal pattern table described later (refer to FIG. 3), and a conversion table (refer to FIG. 6). The RAM 23 temporarily stores various data when the CPU 21 executes the various programs. The flash memory 24 is a non-volatile storage device and stores, for example, image data.

The communication interface 25 is, for example, a wireless LAN interface, a wired LAN interface, or a USB interface and communicates with an external terminal (not illustrated) by connecting. The external terminal is a personal computer, a mobile terminal, a memory card reading device, or the like. The head driver 51 drives the thermal head 5 based on a signal output from the CPU 21 to allow the plurality of heat generation elements H to selectively generate heat. The conveyance motor 61 is connected to the platen roller 6 and driven based on a signal output from the CPU 21. The conveyance motor 61 is driven to rotate the platen roller 6.

The signal pattern table will be described with reference to FIG. 3. The signal pattern table associates the relationship between the signal patterns and the colors in one printing period. The signal pattern indicates the timing for energizing the heat generation element H and the energization time (waveform of the signal) in order to heat the color developing layer 92 to a color developing temperature corresponding to the color developing layer 92. In this illustrative embodiment, the signal pattern table stores the signal patterns for allowing the color developing layers 92 to develop colors for the respective color developing layers 92. That is, the signal pattern table stores the signal patterns of the first color (yellow), the second color (magenta), and the third color (cyan).

The signal pattern of yellow is not limited to a specific waveform, but in this illustrative embodiment, the energization is started (ON) at T0, and then, the energization is stopped (OFF) at T3. In the signal pattern of yellow, in one printing period, the energization is performed at T0 to T1 only once. Therefore, the heat generation of the heat generation element H by the signal pattern of yellow is started at timing T0 and stopped at timing T3. In the signal pattern of magenta, the energization is started at T0, and then, the energization is stopped at T2 before T3.

The signal pattern of magenta is not limited to a specific waveform, but in this illustrative embodiment, the energization for the same time as T0 to T2 is repeated a total of two times at certain intervals. The heat generation of the heat generation element H by the signal pattern of magenta is started from timing T0 and is stopped at timing T4 after T3. In the signal pattern of cyan, the energization is started at T0, and then, the energization is stopped at T1 before T3. The signal pattern of cyan is not limited to a specific waveform, but in this illustrative embodiment, the energization for the same time as T0 to T3 is repeated a total of eight times at certain intervals. The heat generation of the heat generation element H by the signal pattern of cyan is started at timing T0 and is stopped at timing T5 after T4.

Although not illustrated, a signal pattern corresponding to a mixed color is generated each time during printing by calculating a Logic OR of a plurality of signal patterns of yellow, magenta, and cyan. For example, the signal pattern of red (mixed color of yellow and magenta) is generated by calculating Logic OR of the signal pattern of yellow and the signal pattern of magenta. It is noted that the signal pattern corresponding to the mixed colors may also be defined in the signal pattern table. A method of generating the signal pattern corresponding to the mixed colors is not limited to a specific method.

The printer 1 refers to the signal pattern table and specifies the signal pattern corresponding to the color of dots. The printer 1 controls the energization of the heat generation element H for printing the dots according to the specified signal pattern for each one printing period. The heat generation element H generates heat when energized, and dissipates heat when not energized. As described above, the heat generation element H heats the thermosensitive tape 9 from the uppermost layer (first color developing layer 921)

side. For this reason, among the plurality of color developing layers 92, the temperature of the first color developing layer 921 is the highest, and a temperature gradient is generated such that the temperature decreases from the first color developing layer 921 to the third color developing layer 923 in the stacking direction.

By controlling the heat generation of the heat generation element H based on the signal pattern of yellow, the heat generation element H heats the thermosensitive tape 9 at the first heating temperature during the first heating time (T0 to T3). The first heating temperature is a temperature corresponding to the signal pattern of yellow and is higher than the first temperature. Accordingly, the heat generation element H applies the first energy to the thermosensitive tape 9. When the first energy is applied to the thermosensitive tape 9, the temperature of the first color developing layer 921 exceeds the first temperature. Accordingly, the first color developing layer 921 develops yellow.

Even when the first energy is applied to the thermosensitive tape 9 by the signal pattern of yellow, the temperature of the second color developing layer 922 and the temperature of the third color developing layer 923 do not exceed the second temperature and the third temperature, respectively, due to the temperature gradient. Therefore, according to controlling of the heat generation of the heat generation element H based on the signal pattern of yellow, among the plurality of color developing layers 92, only the first color developing layer 921 develops color.

By controlling the heat generation of the heat generation element H based on the signal pattern of magenta, the heat generation element H heats the thermosensitive tape 9 at the second heating temperature during the second heating time (T0 to T4). The second heating time is longer than the first heating time. The second heating temperature is a temperature corresponding to the signal pattern of magenta, and is higher than the second temperature and lower than the first heating temperature. Accordingly, the heat generation element H applies the second energy to the thermosensitive tape 9. The second energy is an amount different from the first energy, and in particular, larger than the first energy. When the second energy is applied to the thermosensitive tape 9, the temperature of the second color developing layer 922 exceeds the second temperature. Accordingly, the second color developing layer 922 develops magenta.

Even when the second energy is applied to the thermosensitive tape 9 by the signal pattern of magenta, the temperature of the third color developing layer 923 does not exceed the third temperature due to the temperature gradient. Even when the second energy is applied to the thermosensitive tape 9 by the signal pattern of magenta, the temperature of the first color developing layer 921 does not exceed the first temperature due to the relationship between the second heating temperature and the second heating time. Therefore, according to controlling of the heat generation of the heat generation element H based on the signal pattern of magenta, among the plurality of color developing layers 92, only the second color developing layer 922 develops color.

By controlling the heat generation of the heat generation element H based on the signal pattern of cyan, the heat generation element H heats the thermosensitive tape 9 at the third heating temperature during the third heating time (T0 to T5). The third heating time is longer than the second heating time. The third heating temperature is a temperature corresponding to the signal pattern of cyan, and is higher than the third temperature and lower than the second heating temperature. Accordingly, the heat generation element H applies the third energy to the thermosensitive tape 9. The third energy is an amount different from the first energy and the second energy, and in particular, larger than the first energy and the second energy. When the third energy is applied to the thermosensitive tape 9, the temperature of the third color developing layer 923 exceeds the third temperature. Accordingly, the third color developing layer 923 develops cyan.

Even when the third energy is applied to the thermosensitive tape 9 by the signal pattern of cyan, the temperature of the first color developing layer 921 and the temperature of the second color developing layer 922 do not exceed the first temperature and the second temperature due to the relationship between the third heating temperature and the third heating time. Therefore, according to controlling of the heat generation of the heat generation element H based on the signal pattern of cyan, among the plurality of color developing layers 92, only the third color developing layer 923 develops color.

It is noted that, according to controlling of the heat generation of the heat generation element H based on the signal pattern of red, among the plurality of color developing layers 92, only the first color developing layer 921 and the second color developing layer 922 develop colors. According to controlling of the heat generation of the heat generation element H based on the signal pattern of blue, among the plurality of color developing layers 92, only the second color developing layer 922 and the third color developing layer 923 develop colors. According to controlling of the heat generation of the heat generation element H based on the signal pattern of green, among the plurality of color developing layers 92, only the first color developing layer 921 and the third color developing layer 923 develop colors. According to controlling of the heat generation of the heat generation element H based on the signal pattern of black, all of the plurality of color developing layers 92 develop colors.

The amount of energy applied from the heat generation element H to the thermosensitive tape 9 based on the signal pattern of the mixed color is larger than the amount of energy applied from the heat generation element H to the thermosensitive tape 9 based on the signal pattern of the single color included in the mixed color. For example, the size of the energy applied from the heat generation element H to the thermosensitive tape 9 based on the signal pattern of blue (mixed color of magenta and cyan) is larger than any one of the second energy based on magenta and the third energy based on cyan.

The image data will be described with reference to FIGS. 4 and 5. The image data indicates a plurality of the dots and colors corresponding to the plurality of dots. In the image data, a print line is configured by a plurality of the dots aligned in the left-right direction, and the plurality of print lines are aligned from the upstream direction to the downstream direction. In the example of the pre-conversion image data illustrated in FIG. 4 and the example of the post-conversion image data illustrated in FIG. 5, each of print lines L1, L2, L3, L4, L5, and L6 is configured with five dots aligned in the left-right direction, and the print lines L1, L2, L3, L4, L5, and L6 are aligned in this order from the upstream direction to the downstream direction. It is noted that the conversion of image data will be described later.

The left-right direction of the image data corresponds to the arrangement direction of the plurality of heat generation elements H (left-right direction of the printer 1). The upstream direction and downstream direction of the image data correspond to the conveyance direction of the thermosensitive tape 9 (forward-backward direction of the printer 1). In particular, when the printing operation is performed based on the image data, among the plurality of print lines, the print line located in a most upstream (print line L1 in FIGS. 4 and 5) is first printed on the thermosensitive tape 9, and the plurality of print lines are printed on the thermosensitive tape 9 in order from the upstream direction to the downstream direction.

Figure 4:
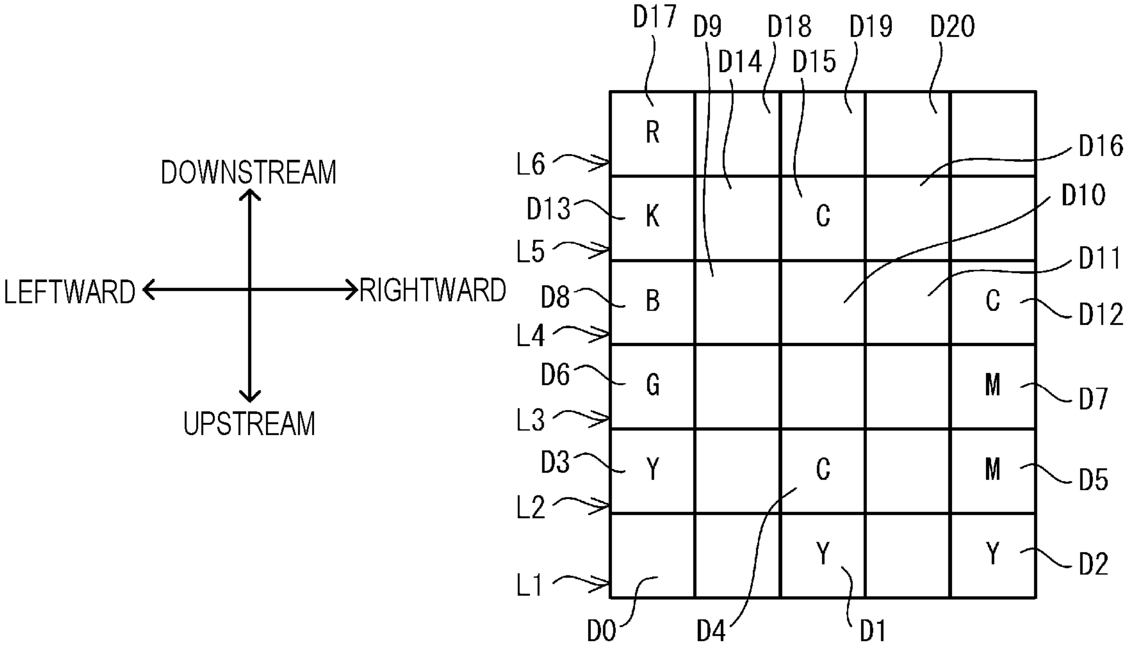
FIG. 4 is a diagram illustrating pre-conversion image data.
Figure 5:
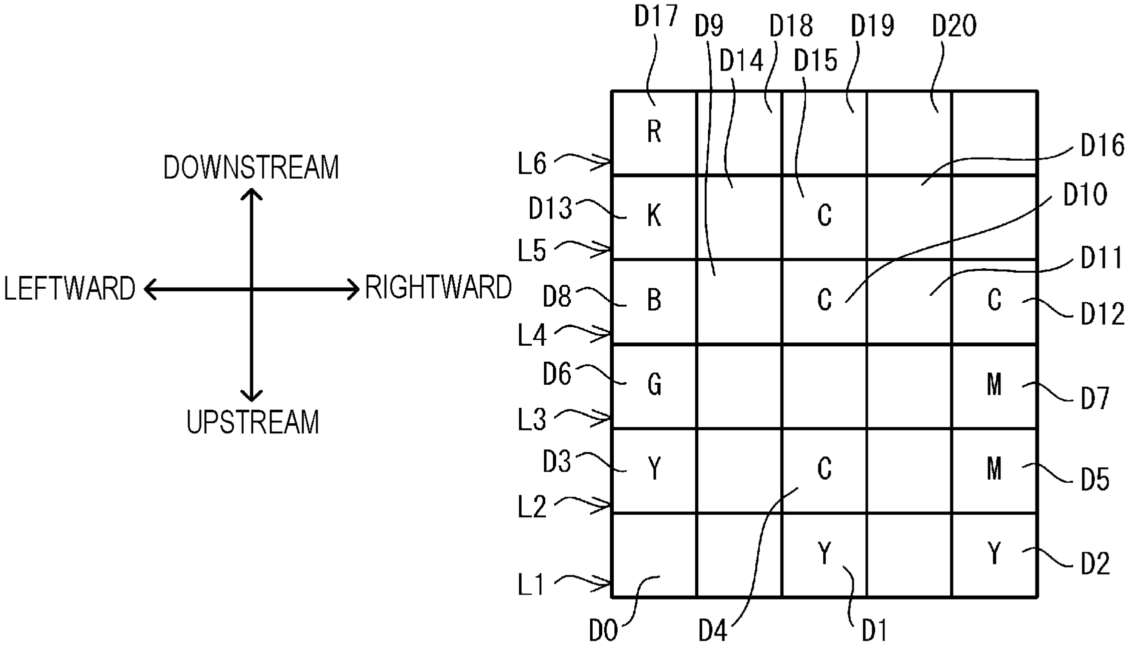
FIG. 5 is a diagram illustrating post-conversion image data converted based on a conversion table.

In the example of the pre-conversion image data illustrated in FIG. 4 and the example of the post-conversion image data illustrated in FIG. 5, the print line L1 includes dots D0, D1, and D2. The print line L2 includes the dots D3, D4, and D5. The print line L3 includes the dots D6 and D7. The print line L4 includes the dots D8, D9, D10, D11, and D12. The print line L5 includes the dots D13, D14, D15, and D16. The print line L6 includes the dots D17, D18, D19, and D20.

In the example of the pre-conversion image data illustrated in FIG. 4, cyan corresponds to the dots D4, D12, and D15. Magenta corresponds to the dots D5 and D7. Yellow corresponds to the dots D1, D2, and D3. Black corresponds to the dots D13. Red corresponds to the dots D17. Green corresponds to the dots D6. Blue corresponds to the dots D8. White corresponds to blank dots (for example, the dots D0, D9, D10, D11, D14, D16, D18, D19, and D20). It is noted that the example of the post-conversion image data illustrated in FIG. 5 is different from the pre-conversion image data illustrated in FIG. 4 in that cyan corresponds to the dots D10.

The target dots, the first surrounding dots, the second surrounding dots, the third surrounding dots, the fourth surrounding dots, the fifth surrounding dots, the sixth surrounding dots, the seventh surrounding dots, and the eighth surrounding dots are defined. The target dots are dots of a color containing magenta (second color) or cyan (third color) in the pre-conversion image data. That is, the target dots are dots of cyan, magenta, black, red, green, or blue. In the example of the pre-conversion image data illustrated in FIG. 4, the dots D4, D5, D6, D7, D8, D12, D13, D15, and D17 are the target dots (dots of the color containing magenta or cyan).

The first surrounding dots are adjacent to the target dots in the upstream direction. The second surrounding dots are adjacent to the target dots in the downstream direction. The third surrounding dots are adjacent to the target dots in the left direction. The fourth surrounding dots are adjacent to the target dots in the right direction. The fifth surrounding dots are adjacent to the third surrounding dots in the upstream direction. The sixth surrounding dots are adjacent to the third surrounding dots in the downstream direction. The seventh surrounding dots are adjacent to the fourth surrounding dots in the upstream direction. The eighth surrounding dots are adjacent to the fourth surrounding dots in the downstream direction. The first surrounding dots, the second surrounding dots, the third surrounding dots, the fourth surrounding dots, the fifth surrounding dots, the sixth surrounding dots, the seventh surrounding dots, and the eighth surrounding dots are collectively referred to as "eight surrounding dots". The first surrounding dots are also referred to as "upstream dots". The upstream dots are adjacent to the target dots and are printed on the thermosensitive tape 9 before the target dots.

For example, when the dots D15 are the target dots, the first surrounding dots (upstream dots), the second surrounding dots, the third surrounding dots, the fourth surrounding dots, the fifth surrounding dots, the sixth surrounding dots, the seventh surrounding dots, and the eighth surrounding dots are the dots D10, the dots D19, the dots D14, the dots D16, the dots D9, the dots D18, the dots D11, and the dots D20, respectively.

Figures 6, 7:
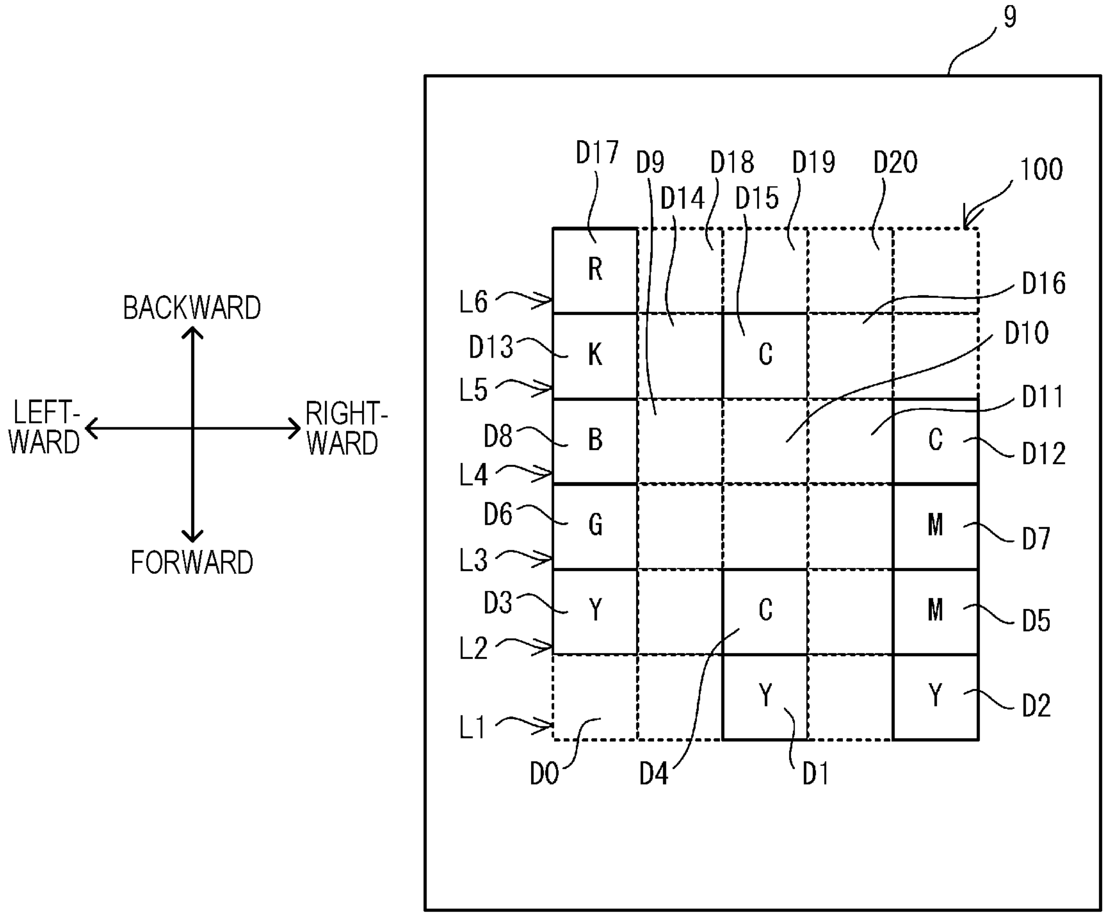
FIG. 6 is a diagram illustrating the conversion table.
FIG. 7 is a diagram illustrating a state where an image 100 is printed on a thermosensitive tape 9 based on the post-conversion image data.

The conversion table will be described with reference to FIG. 6. Although described later in detail, in this illustrative embodiment, image data that is a print target is converted in order to suppress the size of the dots actually printed on the thermosensitive tape 9 from being smaller than the target size. In the following, image data before the conversion is referred to as "pre-conversion image data", and image data after the conversion is referred to as "the post-conversion image data". That is, the pre-conversion image data is converted to the post-conversion image data. The conversion table is referred to by the CPU 21 when the pre-conversion image data is converted to the post-conversion image data.

The conversion table defines a color after the conversion of the conversion dots in accordance with the color of the target dots and the color of the conversion dots. The conversion dot includes at least one of the eight surrounding dots. Specifically, the conversion dots include at least one of the first surrounding dots (upstream dots), the third surrounding dots, the fourth surrounding dots, the fifth surrounding dots, and the seventh surrounding dots. More specifically, the conversion dots include the first surrounding dots (upstream dots). In this illustrative embodiment, the conversion dots are the first surrounding dots (upstream dots).

In the following, the color after the conversion of the conversion dots is referred to as a "conversion color of the conversion dots". In some cases, the relationship between the color of the target dots and the color of the conversion dots may be indicated by "(color of the target dots, color of the conversion dots)". For example, when the color of the target dots is red and the color of the conversion dots is yellow, the relationship is denoted as (R, Y).

In this illustrative embodiment, for example, in the case of (R, W), the conversion table defines red as the conversion color of the conversion dots. Similarly, in the cases (M, W), (B, W), (C, W), (G, W), and (K, W) where the color of the conversion dots is white, the conversion table defines magenta, blue, cyan, green, and black, respectively, as the conversion color of the conversion dots. That is, when the color of the conversion dots is white, the conversion table defines a color containing the color developed by any one of the plurality of color developing layers 92 as the conversion color of the conversion dots. Specifically, the conversion table defines the color of the target dots as the conversion color of the conversion dots.

When the color of the conversion dots is white, the heat generation element H does not generate heat so as to develop the color of the conversion dots. On the other hand, since the conversion color of the conversion dots is a color containing the color developed by any one of the plurality of color developing layers 92, the heat generation element H generates heat so as to develop the conversion color of the conversion dots, and energy corresponding to the heat generation is applied to the thermosensitive tape 9. That is, the conversion table defines the conversion color of the conversion dots so that the energy applied to the thermosensitive tape 9 by the heat generation element H so as to develop the conversion color of the conversion dots is higher than the energy applied to the thermosensitive tape 9 by the heat generation element H so as to develop the color of the conversion dots before the conversion.

It is noted that, in the conversion table, "-" denotes that the color of the conversion dots is not converted. Therefore, when the color of the conversion dots is yellow, red, magenta, blue, cyan, green, or black (when the color of the conversion dots is other than white), the conversion table defines that the color of the conversion dots is not converted even when the color of the target dots is any one of red, magenta, blue, cyan, green, and black.

In particular, the conversion table defines that, in the cases (R, R), (M, M), (B, B), (C, C), (G, G), and (K, K) where the color of the conversion dots is the same as the color of the target dots, the color of the conversion dots is not converted. The conversion table defines that, in the cases (R, R), (M, M), (B, B), (C, C), (G, G), (K, K), (R, M), (B, M), (B, C), (G, C), (K, R), (K, M), (K, B), (K, C), and (K, G) where the color of the conversion dots is included in the color of the target dots, the color of the conversion dots is not converted.

The conversion table is defined not to convert the color of the conversion dots in the cases (R, B), (M, B), (B, B), (C, B), (G, B), (K, B), (R, C), (M, C), (B, C), (C, C), (G, C), (K, C), (R, G), (M, G), (B, G), (C, G), (G, G), (K, G), (R, K), (M, K), (B, K), (C, K), (G, K), and (K, K) where the color of the conversion dots include the color including cyan (color developed by the lowermost layer).

A conversion example of the image data will be described with reference to FIGS. 4 and 5. The CPU 21 converts the pre-conversion image data illustrated in FIG. 4 to the post-conversion image data illustrated in FIG. 5 based on the conversion table (refer to FIG. 6). In the example of the pre-conversion image data illustrated in FIG. 4, the dots D4, D5, D6, D7, D8, D12, D13, D15, and D17 are the target dots (color dots including magenta or cyan). For example, the upstream dots (conversion dots) for the dots D4 (cyan) is the dots D1 (yellow). In this case (C, Y), since the conversion table indicates "-", the color of the upstream dots (conversion dots) is not converted. Therefore, as illustrated in FIG. 5, in the post-conversion image data, the color of the dots D1 remains yellow.

Similarly, the upstream dots (conversion dots) for the dots D5, D6, D7, D8, D12, D13, and D17 are the dots D2, D3, D5, D6, D7, D8, and D13, respectively. In these cases (M, Y), (G, Y), (M, M), (B, G), (C, M), (K, B), and (R, K), since the conversion table indicates "-', the color of the upstream dots (conversion dots) is not converted. Therefore, as illustrated in FIG. 5, in the post-conversion image data, the colors of the dots D2, D3, D5, D6, D7, D8, and D13 remain yellow, yellow, magenta, green, magenta, blue, and black, respectively.

The upstream dots (conversion dots) for the dots D15 (cyan) is the dots D10 (white). In this case (C, W), since the conversion table indicates "C" as the conversion color of the conversion dots, the color of the upstream dots (conversion dots) is converted from white to cyan. Therefore, as illustrated in FIG. 5, in the post-conversion image data, the color of the dots D10 is cyan. As described above, the post-conversion image data illustrated in FIG. 5 is different from the pre-conversion image data illustrated in FIG. 4 only in the color of the dots D10.

An example where printing on the thermosensitive tape 9 is performed based on the post-conversion image data illustrated in FIG. 5 will be described with reference to FIG. 7. The printer 1 prints the print line L1 on the thermosensitive tape 9 first, and then, prints the print lines L1, L2, L3, L4, L5, and L6 on the thermosensitive tape 9 in this order. When all of the print lines L1, L2, L3, L4, L5, and L6 are printed, the dots D1, D2, D3, D4, D5, D6, D7, D8, D12, D13, D15, and D17 are printed on the thermosensitive tape 9. Other dots such as the dots DO, D9, D10, D11, D14, D16, D18, D19, and D20 are white (base material color) and, thus, are not printed on the thermosensitive tape 9. FIG. 7 illustrates the non-printed dots (dots of the base material color) by dashed lines. Accordingly, an image 100 is printed on the thermosensitive tape 9. Details of the printing of the dots D10 and D15 will be described below.

When printing is performed on the thermosensitive tape 9 based on the pre-conversion image data illustrated in FIG. 4, and the print line L4 is printed, since the color of the dots D10 is white, the heat generation element H corresponding to the dots D10 are not energized. For this reason, the heat generation elements H corresponding to the dots D10 do not generate heat during the printing period when the print line L4 is printed.

The heat generation element H corresponding to the dots D10 when the print line L4 is printed is the same as the heat generation element H corresponding to the dots D15 when the print line L5 is printed. For this reason, when the print line L5 is printed, the heat generation element H corresponding to the dots D15 generates heat from the state where the heat generation element H does not generate heat when the immediately preceding print line is printed. Furthermore, on the thermosensitive tape 9, the position corresponding to the dots D10 (position adjacent to the print-scheduled position of the dots D15 in the upstream direction) is not heated. For these reasons, there is a possibility that the heat generation element H corresponding to the dots D15 may not heat up to the target temperature or may not be able to maintain the target temperature for the target time. Therefore, there is a possibility that the third color developing layer 923 may not develop colors by the target size of the dots D15, and the size of the dots D15 on the thermosensitive tape 9 may be smaller than the target size.

On the other hand, in this illustrative embodiment, printing on the thermosensitive tape 9 is performed based on the post-conversion image data illustrated in FIG. 5. For this reason, when the print line L4 is printed, since the color of the dots D10 in the post-conversion image data is cyan, the heat generation element H corresponding to the dots D10 is energized based on the signal pattern of cyan (refer to FIG. 3). For this reason, the heat generation element H corresponding to the dots D10 (that is, the heat generation element H corresponding to the dots D15) generates heat during the printing period when the print line L4 is printed. That is, before the print line L5 is printed, the heat generation element H corresponding to the dots D15 generates heat, and the position corresponding to the dots D10 on the thermosensitive tape 9 (position adjacent to the print-scheduled position of the dots D15 in the upstream direction) is in a heated state.

For these reasons, when the print line L5 is printed, the heat generation element H corresponding to the dots D15 rises relatively quickly in heat generation temperature, and is likely to maintain the target temperature for the target time. Therefore, the third color developing layer 923 is likely to develop colors by the target size of the dots D15. Therefore, the printer 1 contributes to the advantage of suppressing the size of the dots D15 on the image 100 from being smaller than the target size.

The main process will be described with reference to FIG. 8. The user mounts the thermosensitive tape 9 (tape cassette in this illustrative embodiment) in the mounting portion (not illustrated) and turns on the power of the printer 1. The user operates the external terminal or the operation switch 4 to input a print start instruction to the printer 1. When the CPU 21 obtains the print start instruction, the CPU 21 reads a program from the flash memory 24 and executes the main process. The print start instruction designates the pre-conversion image data that is a print target. In the main process, conversion of the pre-conversion image data (refer to FIG. 4) to the post-conversion image data (refer to FIG. 5), printing on the thermosensitive tape 9 based on the post-conversion image data (refer to FIG. 5), and the like are controlled.

When the main process is started, the CPU 21 obtains the pre-conversion image data (refer to FIG. 4) that is a print target designated by the print start instruction from the external terminal via the communication interface 25 or obtains the pre-conversion image data from the flash memory 24 (S11). The CPU 21 performs a conversion process (S12). In the conversion process, the pre-conversion image data (refer to FIG. 4) is converted to the post-conversion image data (refer to FIG. 5).

Figure 9:
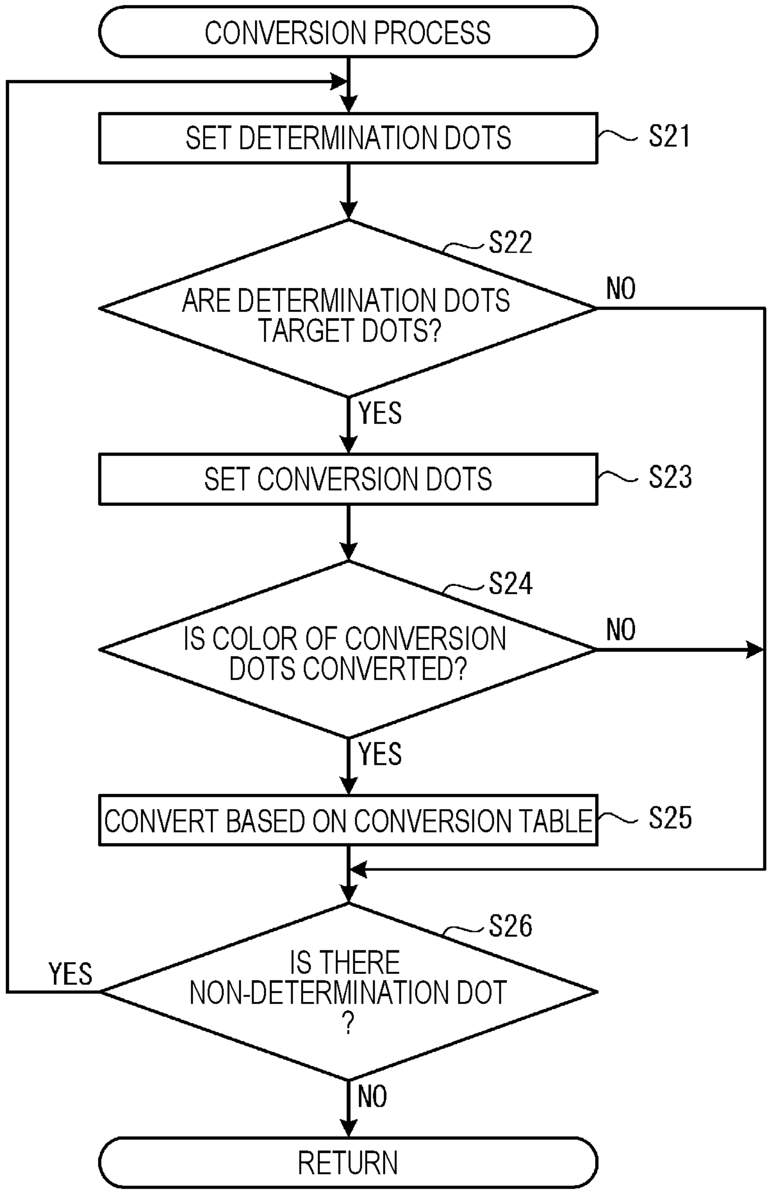
FIG. 9 is a flowchart of a conversion process.

The conversion process will be described with reference to FIG. 9. When the conversion process is started, the CPU 21 sets determination dots in the pre-conversion image data (refer to FIG. 4) (S21). The determination dots are dots that are determination targets in step S22 described later among a plurality of the dots in the pre-conversion image data. In the following, one or a plurality of the dots in the pre-conversion image data that are not set as the determination dots in the process of S21 will be referred to as “non-determination dots”. The CPU 21 sets one of one or the plurality of non-determination dots as the determination dots every time when process of S21 is executed.

In the process of S21, the CPU 21 designates the print lines in order from the upstream direction to the downstream direction in the pre-conversion image data. In the example of the pre-conversion image data illustrated in FIG. 4, the print line L1 is designated first, and then, the print lines L2, L3, L4, L5, and L6 are designated in this order. When the designated print line includes the non-determination dots, the CPU 21 sets the determination dots in order from one side (for example, leftward side) to the other side (for example, rightward side) of the left-right direction every time when process of S21 is executed. In the example of the pre-conversion image data illustrated in FIG. 4, when the print line L1 is designated, the dots D0 are first set as the determination dots, and every time when the process of S21 is executed, the right side of the dots D0, the dots D1, the right side of the dots D1, and the dots D2 are set as the determination dots in this order.

The CPU 21 determines whether the determination dots are the target dots (S22). In this illustrative embodiment, the CPU 21 determines whether the color of the determination dots is red, magenta, blue, cyan, green, or black (color containing the second color or the third color). When the determination dots are not the target dots (S22: NO), that is, when the color of the determination dots is yellow or white, the CPU 21 transitions the process to determination of S26. In the example of the pre-conversion image data illustrated in FIG. 4, for example, when the dots D0 (white) or the dots D1 (yellow) are the determination dots, the CPU 21 determines that the determination dots are not the target dots (S22: NO).

When the determination dots are the target dots (S22: YES), that is, when the color of the determination dots is magenta, cyan, red, green, blue, or black, the CPU 21 sets the conversion dots (upstream dots) (S23). In the example of the pre-conversion image data illustrated in FIG. 4, for example, when the dots D6 (green) or the dots D15 (cyan) are the determination dots, the CPU 21 determines that the determination dots are the target dots (S22: YES). When the dots D6 are the determination dots, the CPU 21 sets the dots D3 as the conversion dots (S23). When the dots D15 are the determination dots, the CPU 21 sets the dots D10 as the conversion dots (S23).

The CPU 21 determines whether to convert the color of the conversion dots based on the conversion table (refer to FIG. 6) (S24). In the process of S24, the CPU 21 refers to the conversion table, and it is specified that the conversion color of the conversion dots is defined in the conversion table in accordance with the color of the determination dots (target dots) set in S21 and the color of the conversion dots set in S23. For example, when the dots D6 are the determination dots, since the color of the dots D3 (conversion dots) is yellow, the conversion color of the conversion dots is not defined in the conversion table. When the dots D15 are the determination dots, since the color of the dots D10 (conversion dots) is white, cyan is defined in the conversion table as the conversion color of the conversion dots.

In the relationship between the color of the target dots and the color of the conversion dots, when “-” is defined in the conversion table, the CPU 21 does not convert the color of the conversion dots (S24: NO). In this case, the CPU 21 transitions the process to the determination of S26. For example, when the dots D6 are the determination dots, the CPU 21 does not convert the color of the dots D6 (conversion dots) (S24: NO). In the relationship between the color of the target dots and the color of the conversion dots, when the conversion color of the conversion dots is defined in the conversion table (S24: YES), the CPU 21 converts the color of the conversion dots to the conversion color (S25). When the dots D15 are the determination dots, the color of the dots D10 (conversion dots) is converted to cyan (conversion color) (S25).

The CPU 21 determines whether there is a non-determination dot among the plurality of dots in the pre-conversion image data (S26). When there is a non-determination dot (S26: YES), the CPU 21 returns the process to S21. When there is no non-determination dot (S26: NO), that is, when all of the plurality of dots in the pre-conversion image data are set as determination dots by the process of S21, the CPU 21 returns the process to the main process (refer to FIG. 8). Therefore, the CPU 21 converts, for example, the pre-conversion image data illustrated in FIG. 4 to the post-conversion image data illustrated in FIG. 5.

Figure 8:
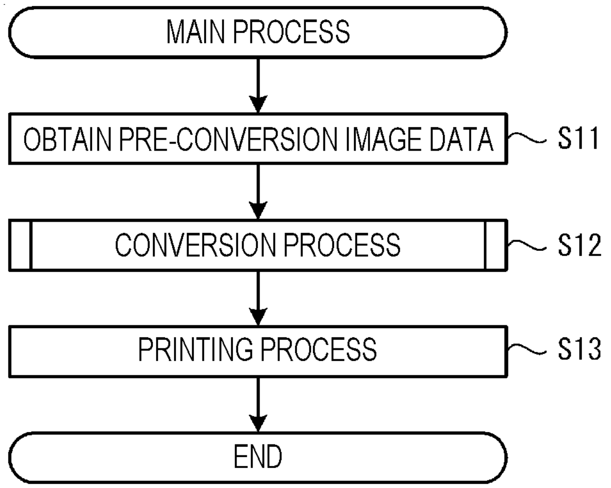
FIG. 8 is a flowchart of a main process.

The process returns to the description of FIG. 8. After the conversion process, the CPU 21 performs a printing process based on the post-conversion image data (refer to FIG. 5) (S13). In the printing process, the CPU 21 specifies the color of each of the plurality of dots for each print line based on the post-conversion image data. The CPU 21 associates the signal pattern corresponding to the specified color with each of the plurality of dots for each print line with reference to the signal pattern table (refer to FIG. 3). It is noted that, when the specified color is a mixed color, the CPU 21 generates a mixed color signal pattern and associates the mixed color signal pattern with the mixed color dot. Accordingly, the CPU 21 generates the print data for controlling the energization of the heat generation elements H corresponding to the respective plurality of the dots for each print line.

Furthermore, the CPU 21 controls the thermal head 5 based on the print data while controlling the conveyance motor 61. Accordingly, the plurality of heat generation elements H selectively generate heat. The plurality of color developing layers 92 are heated from each of the plurality of heat generation elements H in accordance with the signal pattern. Accordingly, the plurality of print lines are printed on the thermosensitive tape 9, and the image 100 (refer to FIG. 7) is printed.

The main functions and effects of the above-described illustrative embodiment will be described. In the following, a case where the pre-conversion image data illustrated in FIG. 4 is converted to the post-conversion image data illustrated in FIG. 5 based on the conversion table illustrated in FIG. 6 and the image 100 is printed on the thermosensitive tape 9 in FIG. 7 will be described as an appropriate example.

In the above-described illustrative embodiment, in the conversion process (S12), the CPU 21 converts the color of the conversion dots to the color of the target dots as the conversion color in the pre-conversion image data. For example, when the dots D15 are the target dots, the dots D10 become the upstream dots (conversion dots), and the conversion color becomes the color (cyan) of the dots D15 (target dots). In this case, in the conversion process (S12), the CPU 21 converts the color of the dots D10 in the pre-conversion image data to the color (cyan) of the dots D15 as the conversion color.

Accordingly, the CPU 21 controls the thermal head 5 and the platen roller 6 to print the dots D10 of cyan on the thermosensitive tape 9 based on the post-conversion image data. In this case, the heat generation element H for printing the dots D15 (target dots) on the thermosensitive tape 9 generates heat so as to print the dots D10 (upstream dots) on the thermosensitive tape 9 before the dots D15 are printed on the thermosensitive tape 9. For this reason, the heat generation element H for printing the dots D15 on the thermosensitive tape 9 is likely to generate heat when printing the dots D15 on the thermosensitive tape 9. Therefore, the CPU 21 contributes to the advantage of suppressing the size of the dots D15 (target dots) actually printed on the thermosensitive tape 9 from being smaller than the target size. Furthermore, the CPU 21 contributes to the advantage of shortening the time until the color developing of the third color developing layer 923 (lowermost layer) is started. The CPU 21 contributes to the advantage of suppressing the position of the dots D15 (target dots) actually printed on the thermosensitive tape 9 from shifting from the target position in the downstream direction. It is noted that, when the color of the target dots contains the color (magenta) developed by the second color developing layer 922 (intermediate layer), the CPU 21 contributes to the advantage of shortening the time until the color developing of the second color developing layer 922 (intermediate layer) is started.

Since the conversion color is the color of the target dots, the CPU 21 controls the thermal head 5 and the platen roller 6 so that the dots D10 of the same color (cyan) as the color (cyan) of the dots D15 are printed on the thermosensitive tape 9. Therefore, the CPU 21 contributes to the advantage of suppressing dots of a color different from the color (cyan) of the dots D15 (target dots) from being printed as the dots D10 (upstream dots).

When too much energy is applied to the thermosensitive tape 9 so as to convert the color of the conversion dots and print the conversion dots of which color is converted, there is a possibility that the size of the target dots actually printed on the thermosensitive tape 9 can be larger than the target size. In the above-described illustrative embodiment, when the color of the conversion dots is the same as the color of the target dots, the CPU 21 does not convert the color of the conversion dots. Accordingly, the CPU 21 contributes to the advantage of suppressing the size of the dots D15 (target dots) actually printed on the thermosensitive tape 9 from being larger than the target size.

For example, when the color of the conversion dots (upstream dots) is a color (white) that does not contain any of the colors (yellow, magenta, and cyan) developed by each of the plurality of color developing layers 92, the heat generation element H for printing the target dots on the thermosensitive tape 9 does not generate heat before the target dots are printed on the thermosensitive tape 9. In the conversion process (S12), when the color of the conversion dots is a color (white) that does not contain any of the colors (yellow, magenta, and cyan) developed by each of the plurality of color developing layers 92, the CPU 21 converts the color of the conversion dots to the conversion color. For example, when the dots D15 are the target dots, since the color of the dots D10 (conversion dots) is white, the CPU 21 converts the color of the dots D10 to the conversion color. Accordingly, the heat generation element H for printing the dots D15 (target dots) on the thermosensitive tape 9 generates heat so as to print the dots D10 (conversion dots) on the thermosensitive tape 9 before the dots D15 are printed on the thermosensitive tape 9. Therefore, the CPU 21 contributes to the advantage of suppressing the size of the dots D15 (target dots) actually printed on the thermosensitive tape 9 from being smaller than the target size.

In the above-described illustrative embodiments, the first color developing layer 921 corresponds to the "first layer". The second color developing layer 922 or the third color developing layer 923 corresponds to the "second layer". The platen roller 6 corresponds to the "conveyance device". The CPU 21 that performs the process of S11 of FIG. 8 corresponds to the "obtainment unit". The CPU 21 that performs the process of S25 of FIG. 9 corresponds to the "conversion unit". The CPU 21 that performs the process of S13 of FIG. 8 corresponds to a "printing control unit". The first surrounding dots and the second surrounding dots correspond to "a pair of first dots". The third surrounding dots and the fourth surrounding dots correspond to "a pair of second dots". The fifth, sixth, seventh, and eighth surrounding dots correspond to "four third dots". When the second color developing layer 922 corresponds to a second layer, the third color developing layer 923 corresponds to a "third layer". A conversion table that defines "-" for (R, R), (M, M), (B, B), (C, C), (G, G), and (K, K) corresponds to the "prohibitor". The process of S11 in FIG. 8 corresponds to the "obtainment process". The process of S25 in FIG. 9 corresponds to the "conversion process". The process of S13 in FIG. 8 corresponds to the "printing control process".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the above-described illustrative embodiment, the printer 1 may convey the thermosensitive tape 9 by a roller or the like other than the platen roller 6 instead of the platen roller 6 or in addition to the platen roller 6. The printer 1 may print on, for example, a thermosensitive paper instead of the thermosensitive tape 9 as the thermosensitive medium. That is, the thermosensitive medium may not have an elongated shape. The thermosensitive tape 9 may not include one or both of the release paper 90 and the overcoat layer 93.

In the above-described illustrative embodiment, the plurality of color developing layers 92 are configured with the three color developing layers 92 of the first color developing layer 921, the second color developing layer 922, and the third color developing layer 923. On the other hand, the plurality of color developing layers 92 may be configured with two color developing layers 92 or may be configured with four or more color developing layers 92. When there are two color developing layers 92, there is no intermediate layer. In this case, the target dots are the dots of the color that the lowermost layer develops. When there are four or more color developing layers 92, the intermediate layer is configured with a plurality of the color developing layers 92. In this case, the target dots are dots of a color containing the color developed by the lowermost layer or the colors developed by a plurality of the intermediate layers. The target dots may be dots of a color containing the color (third color in the above-described illustrative embodiment) developed by the lowermost layer or may be dots of the color (third color in the above-described illustrative embodiment) developed by the lowermost layer.

In the above-described illustrative embodiment, the conversion table defines the color of the target dots as the conversion color of the conversion dots. On the other hand, the conversion table may define a color different from the color of the target dots as the conversion color of the conversion dots. The conversion table may define, for example, a color containing the color of the target dots or may define a color containing the color developed by any one of the plurality of color developing layers 92 as the conversion color of the conversion dots. In the above-described illustrative embodiment, the color developed by any one of the plurality of color developing layers 92 is any one of cyan, magenta, yellow, black, red, green, and blue. The conversion table may define the conversion color of the conversion dots in accordance with the color of the target dots, regardless of the color of the conversion dots. For example, the conversion table may define the conversion color of the conversion dots in accordance with the color of the target dots regardless of whether or not the color of the conversion dots is white. The conversion table may define the conversion color of the conversion dots regardless of any one of the color of the target dots and the color of the conversion dots. For example, regardless of whether or not the color of the conversion dots is white, and regardless of whether the color of the target dots is any one of cyan, magenta, yellow, black, red, green, and blue, the conversion table may define a color containing the color (cyan in the above-described illustrative embodiment) developed by the lowermost layer as the conversion color of the conversion dots.

Figures 10, 11:
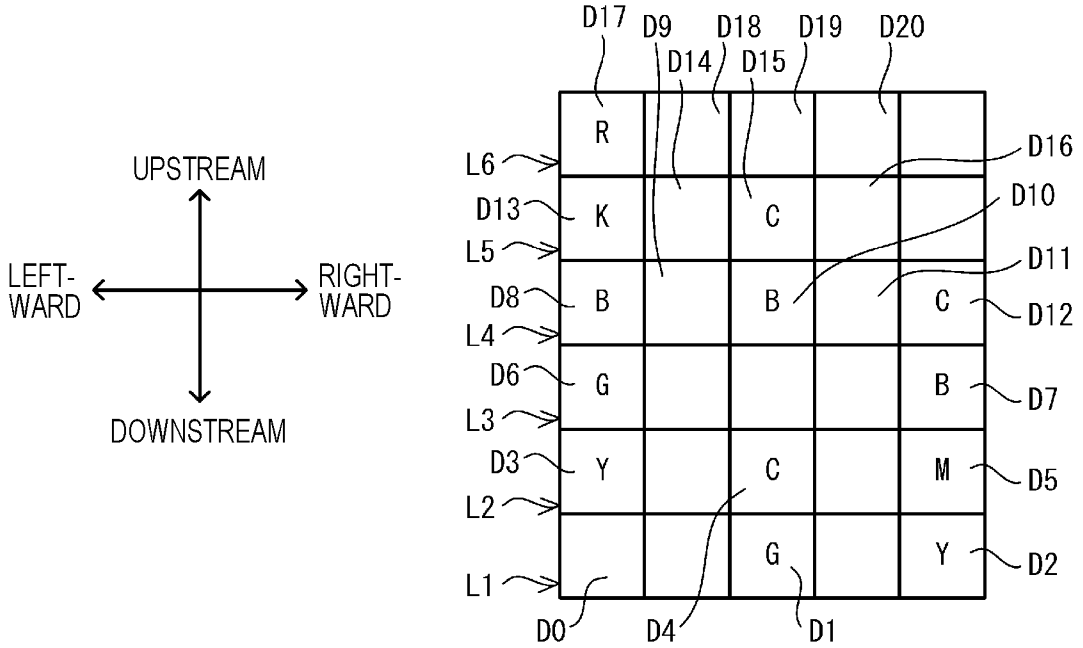
FIG. 10 is a diagram illustrating a conversion table of a modified example.
FIG. 11 is a diagram illustrating the post-conversion image data converted based on the conversion table of the modified example.

The conversion table of the modified example will be described with reference to FIG. 10. In each of "X1" to "X43", the conversion table of the modified example may define that the color of the conversion dots is not converted or may define the conversion color of the conversion dots. For example, the conversion table of the modified example may define the color of the target dots as the conversion color of the conversion dots in each of "X1" to "X43". In each of "X1" to "X43", the conversion table of the modified example may define a color different from the color of the target dots and containing a color developed by any one of the plurality of color developing layers 92.

The conversion table of the modified example defines green as the conversion color of the conversion dots in (C, Y). Green (conversion color) is a mixed color of cyan (color of the target dots) and yellow (color of the conversion dots). The conversion table of the modified example defines blue as the conversion color of the conversion dots in (C, M). Blue (conversion color) is a mixed color of cyan (color of the target dots) and magenta (color of the conversion dots). The conversion table of the modified example defines blue as the conversion color of the conversion dots in (C, W). Blue (conversion color) is a mixed color containing cyan (color of the target dots).

The conversion table of the modified example defines blue as the conversion color of the conversion dots in (M, W). Blue (conversion color) is a mixed color of magenta (color of the target dots) and cyan (third color). The conversion table of the modified example defines cyan as the conversion color of the conversion dots in (G, W). Since green (color of the target dots) is a mixed color of cyan (conversion color) and yellow, cyan (conversion color) is contained in green (color of the target dots).

Figure 3:
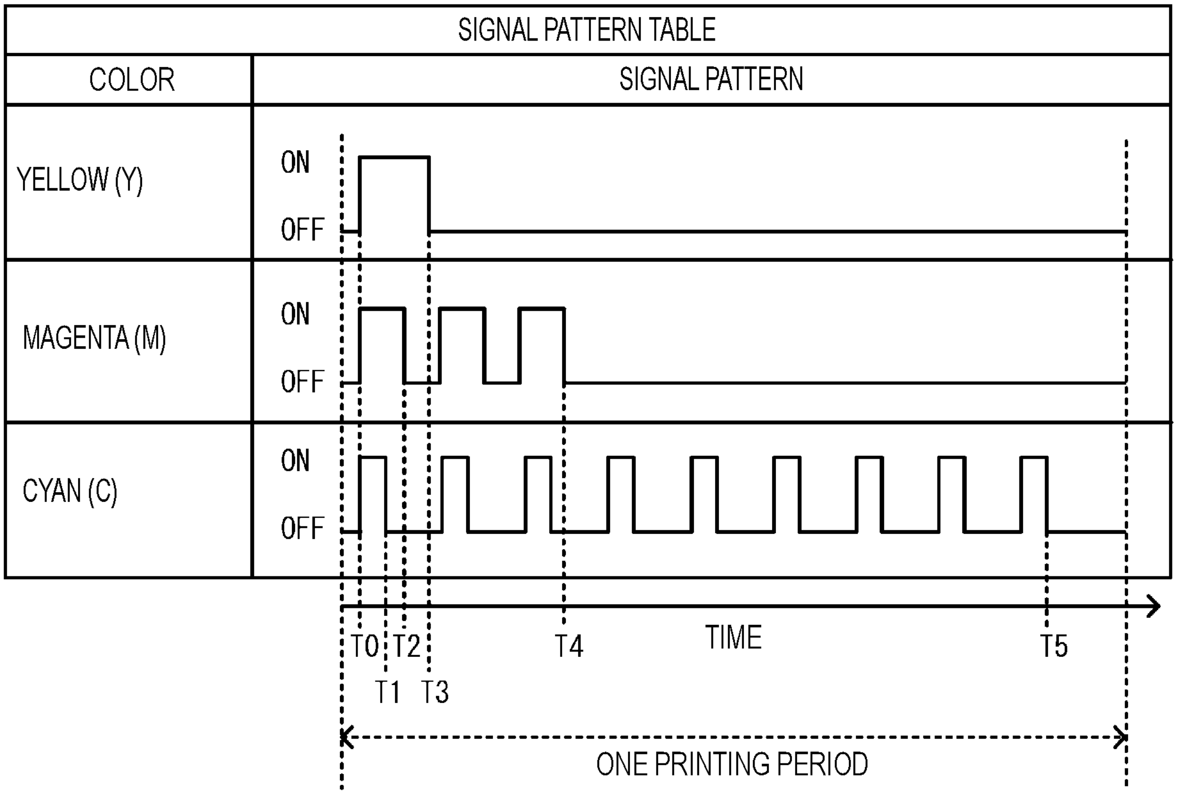
FIG. 3 is a diagram illustrating a signal pattern table.

The post-conversion image data when the pre-conversion image data illustrated in FIG. 3 is converted based on the conversion table of the modified example illustrated in FIG. 10 will be described with reference to FIG. 11. In addition, differences from the case where the pre-conversion image data illustrated in FIG. 3 is converted based on the conversion table illustrated in FIG. 5 will be described. In the pre-conversion image data illustrated in FIG. 3, the upstream dots (conversion dots) for the dots D4 (cyan) are the dots D1 (yellow). In this case (C, Y), since the conversion table of the modified example illustrated in FIG. 10 indicates "G" as the conversion color of the conversion dots, the color of the upstream dots (conversion dots) is converted from yellow to green. Therefore, as illustrated in FIG. 11, in the post-conversion image data, the color of the dots D1 is green.

In the pre-conversion image data illustrated in FIG. 3, the upstream dots (conversion dots) for the dots D12 (cyan) are the dots D7 (magenta). In this case (C, M), since the conversion table of the modified example illustrated in FIG. 10 indicates "B" as the conversion color of the conversion dots, the color of the upstream dots (conversion dots) is converted from magenta to blue. Therefore, as illustrated in FIG. 11, in the post-conversion image data, the color of the dots D7 is blue.

In the pre-conversion image data illustrated in FIG. 3, the upstream dots (conversion dots) for the dots D15 (cyan) are the dots D10 (white). In this case (C, W), since the conversion table of the modified example illustrated in FIG. 10 indicates "B" as the conversion color of the conversion dots, the color of the upstream dots (conversion dots) is converted from white to blue. Therefore, as illustrated in FIG. 11, in the post-conversion image data, the color of the dots D10 is blue.

It is noted that, although not illustrated, in the pre-conversion image data, when there are target dots in which the color of the target dots is green and the color of the conversion dots is white, the color of the conversion dots is converted from white to cyan. Although not illustrated, in the pre-conversion image data, when there are target dots in which the color of the target dots is magenta and the color of the conversion dots is white, the color of the conversion dots is converted from white to blue.

According to the conversion table of the modified example, when the color of the target dots is cyan (third color) and the color of the upstream dots is yellow (first color), the color of the upstream dots is converted to a color containing yellow (first color) and cyan (color of the target dots) as the conversion color. In this case, before the target dots are printed on the thermosensitive tape 9, the heat generation element H for printing the target dots on the thermosensitive tape 9 generates heat with relatively large energy. For this reason, the heat generation element H for printing the target dots on the thermosensitive tape 9 is furthermore likely to generate heat when printing the target dots on the thermosensitive tape 9. Therefore, the CPU 21 contributes to the advantage of further shortening the time until the color developing of the color developing layer 92 for developing the color of the target dots is stared.

When the color of the target dots is cyan (third color) and the color of the upstream dots is magenta (second color), the color of the upstream dots is converted to a color containing magenta (second color) and cyan (color of the target dots) as the conversion color. In this case as well, before printing the target dots on the thermosensitive tape 9, the heat generation elements H for printing the target dots on the thermosensitive tape 9 generate heat with relatively large energy. Therefore, the CPU 21 contributes to the advantage of further shortening the time until the color developing of the color developing layer 92 for developing the color of the target dots is started.

According to the conversion table of the modified example, when the color of the target dots is magenta (second color) and the color of the upstream dots is white, the color of the upstream dots is converted to a color containing magenta (color of the target dots) and cyan (third color) as the conversion color. In this case, the CPU 21 converts the color (white) of the upstream dots to blue (color containing cyan) as the conversion color. Accordingly, the heat generation element H for printing the target dots on the thermosensitive tape 9 generates heat with relatively large energy before printing the target dots on the thermosensitive tape 9. For this reason, the heat generation element H for printing the target dots on the thermosensitive tape 9 is more likely to generate heat when printing the target dots on the thermosensitive tape 9. Therefore, the CPU 21 contributes to the advantage of further shortening the time until the color developing of the second color developing layer 922 is started.

It is noted that, in the conversion table of the modified example, the conversion table of the above-described illustrative embodiment and the conversion table of the modified example may be appropriately combined with each other such as applying only (C, W) to the conversion table of the above-described illustrative embodiment.

In the above-described illustrative embodiment, the conversion dots are the first surrounding dots (upstream dots). On the other hand, the conversion dots may include other surrounding dots in addition to the first surrounding dots (upstream dots) or dots that are not the surrounding dots. The conversion dots may include at least one of the third surrounding dots, the fourth surrounding dots, the fifth surrounding dots, and the seventh surrounding dots. The conversion dots may include at least one of the second surrounding dots, the sixth surrounding dots, and the eighth surrounding dots.

Figure 12:
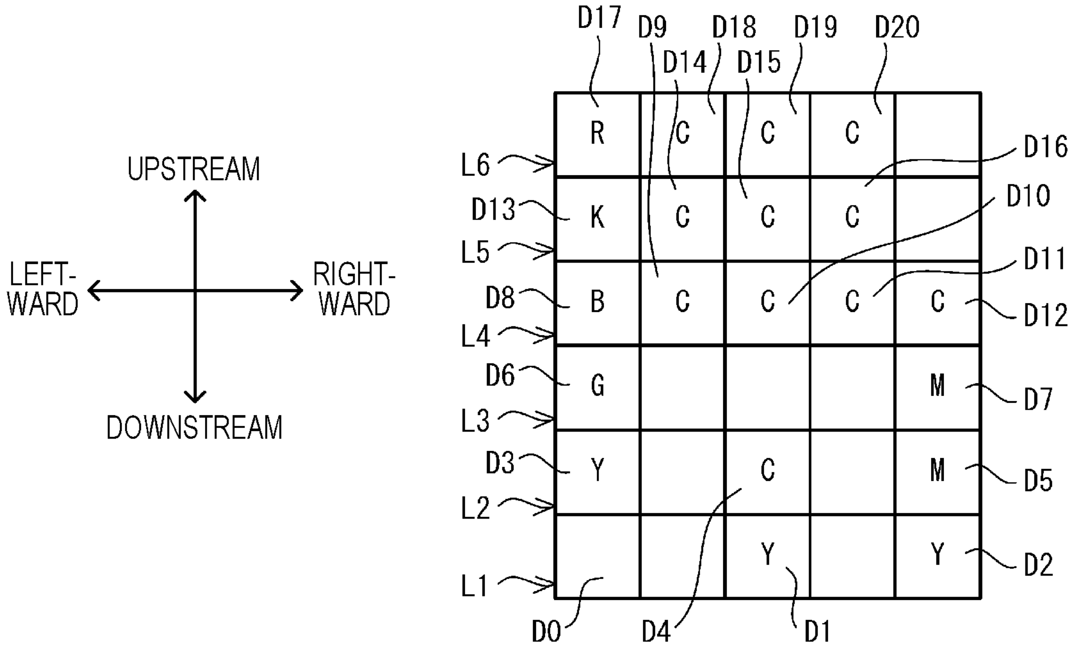
FIG. 12 is a diagram illustrating the post-conversion image data for describing conversion dots of the modified example.

As an example, FIG. 12 illustrates the post-conversion image data when the pre-conversion image data illustrated in FIG. 3 is converted based on the conversion table illustrated in FIG. 5 when the conversion dots are all eight surrounding dots. In this case, in addition to the dots D10, each color of the dots D9, the dots D11, the dots D14, the dots D16, the dots D18, the dots D19, and the dots D20 is also converted from white to cyan (conversion color).

For example, when the third surrounding dots (dots D14) and the fourth surrounding dots (dots D16) are printed, each of the heat generation elements H adjacent to both the leftward and rightward sides with respect to the heat generation element H corresponding to the target dots (dots D15) generates heat when printing the target dots (dots D15). For this reason, in the case where the third surrounding dots (dots D14) or the fourth surrounding dots (dots D16) is included in the conversion dots, when the target dots (dots D15) are printed, heat of the heat generation element H corresponding to the target dots (dots D15) is suppressed from escaping in the left-right direction.

For example, when the fifth surrounding dots (dots D9) and the seventh surrounding dots (dots D11) are printed, each of the heat generation elements H adjacent to both of the leftward and rightward sides with respect to the heat generation element H corresponding to the target dots (dots D15) generates heat before printing of the target dots (dots D15). For this reason, when the fifth surrounding dots (dots D9) or the seventh surrounding dots (dots D11) are included in the conversion dots, the heat generation element H according to the target dots (dots D15) is heated from the left-right direction before the target dots (dots D15) is printed.

For example, when the second surrounding dots (dots D19), the sixth surrounding dots (dots D18), and the eighth surrounding dots (dots D20) are printed, each of the heat generation element H that is the same as the heat generation element H corresponding to the target dots (dots D15) or the heat generation elements H adjacent to both of the leftward and rightward sides with respect to the heat generation elements H corresponding to the target dots (dots D15) generates heat after printing the target dots (dots D15). For this reason, when the second surrounding dots (dots D19), the sixth surrounding dots (dots D18), or the eighth surrounding dots (dots D20) are included in the conversion dots, during the printing of the target dots (dots D15), the heat generation element H corresponding to the second surrounding dots (dots D19), the sixth surrounding dots (dots D18), or the eighth surrounding dots (dots D20) is heated by the heat generation element H corresponding to the target dots (dots D15).

As described above, even when any of the plurality of surrounding dots is included in the conversion dots, the heat generation property of the heat generation element H corresponding to the target dots is improved. Therefore, even when any of the plurality of surrounding dots is included in the conversion dots, the CPU 21 contributes to the advantage of suppressing the size of the target dots actually printed on the thermosensitive tape 9 from being smaller than the target size.

Figure 13:
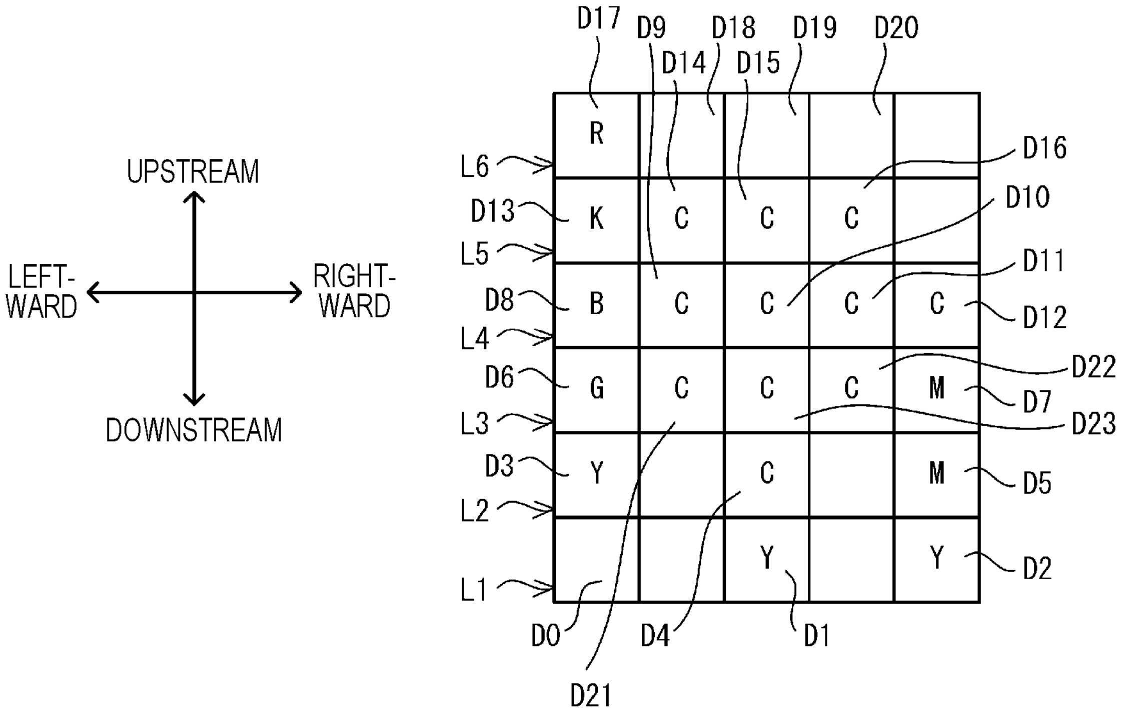
FIG. 13 is a diagram illustrating the post-conversion image data for describing the conversion dots of the modified example.

In addition to one or a plurality of the eight surrounding dots, the conversion dots may further include the dots adjacent to the one or a plurality of surrounding dots. FIG. 13 illustrates the post-conversion image data when the pre-conversion image data illustrated in FIG. 3 is converted, based on the conversion table illustrated in FIG. 5, as an example, when the conversion dots include the first surrounding dots, the third surrounding dots, the fourth surrounding dots, the fifth surrounding dots, and the seventh surrounding dots. In FIG. 14, the conversion dots include the first surrounding dots, the fifth surrounding dots, and the seventh surrounding dots in addition to the first surrounding dots, the third surrounding dots, the fourth surrounding dots, the fifth surrounding dots, and the seventh surrounding dots. In this case, in addition to the dots D10, the colors of the dots D9 and the dots D11 are converted from white to cyan (conversion color), and furthermore, the colors of the dots D21, D22, and D23 adjacent to the respective colors of the dots D9, D10, and D11 in the upstream direction are also converted from white to cyan (conversion color).

A case where a conversion dot contains a plurality of surrounding dots will be described. In this case, the conversion colors of the conversion dots may be different in accordance with each conversion dot, or may be the same. When all of the plurality of conversion dots are white, the CPU 21 may convert the color of the conversion dots, and when some of the conversion dots are white, the CPU 21 may convert the color of the conversion dots.

In the above-described illustrative embodiment, even when the color of the conversion dots is the same as the color of the target dots, the CPU 21 may convert the color of the conversion dots. In this case, for example, in (C, C), the conversion table may define blue (mixed color containing the color of the target dots) as the conversion color of the conversion dots. When the color of the conversion dots is contained in the color of the target dots, the CPU 21 may convert the color of the conversion dots. In this case, in (B, C), the conversion table may define blue (mixed color containing the color of the target dots) as the conversion color of the conversion dots. When the color of the conversion dots includes cyan (color developed by the lowermost layer), the CPU 21 may convert the color of the conversion dots. In this case, for example, in (C, C), the conversion table may define blue (mixed color containing cyan) as the conversion color of the post-conversion dot.

In the above-described illustrative embodiment, the CPU 21 determines whether or not to convert the color of the conversion dots based on the conversion table and specifies the conversion color of the conversion dots when converting the color of the conversion dots. On the other hand, in the conversion process, the CPU 21 may determine each of the color of the target dots and the color of the conversion dots, may determine whether or not to convert the color of the conversion dots in accordance with the determination result, and may specify the color of the conversion dots in accordance with the determination result when converting the color of the conversion dots.

Instead of the CPU 21, a microcomputer, ASIC (Application Specific Integrated Circuits), FPGA (Field Programmable Gate Array), or the like may be used as the processor. The main process may be distributively processed by a plurality of processors. The non-transitory storage medium such as the ROM 22 and the flash memory 24 may be any storage medium that can retain information regardless of an information storage period. The non-transitory storage medium may not include a transitory storage media (for example, transmitted signals). For example, the program may be downloaded (that is, transmitted as a transmission signal) from a server connected to a network (not illustrated) and may be stored in the ROM 22 or the flash memory 24. In this case, the program may be stored in a non-transitory storage medium such as an HDD provided in the server.

What is claimed is:

1. A printer configured to perform printing on a thermosensitive medium, the thermosensitive medium comprising a base material and a plurality of color developing layers that are layers stacked on the base material in a stacking direction and that develop colors in accordance with energy applied, the plurality of color developing layers comprising:

a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer comprising:

a conveyance device configured to convey the thermosensitive medium in a conveyance direction;

a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction; and a control device configured to:

receive pre-conversion image data;

convert the received pre-conversion image data to post-conversion image data; and perform a printing control comprising outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device, wherein the pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively, and wherein in the converting, in a case target dots that are dots of a color containing the second color is included in the plurality of dots in the pre-conversion image data, the control device is configured to convert a color of conversion dots to a conversion color containing a color developed by any one of the plurality of color developing layers, the conversion dots being at least one of dots among a pair of first dots adjacent to the target dots in the sub-scanning direction, a pair of second dots adjacent to the target dots in the main-scanning direction, and four third dots adjacent to each of the pair of second dots in the sub-scanning direction.

2. The printer according to claim 1, wherein in the converting, the control device is configured to convert the color of the conversion dots comprising at least one dot of upstream dots printed on the thermosensitive medium by the thermal head before the target dots in the pair of first dots, the pair of second dots, and the pair of third dots printed on the thermosensitive medium by the thermal head before the target dots in the four third dots to the conversion color.

3. The printer according to claim 2, wherein in the converting, the control device is configured to convert the color of the conversion dots comprising the upstream dots to the conversion color.

4. The printer according to claim 2, wherein the plurality of color developing layers further comprises a third layer disposed between the base material and the second layer in the stacking direction and configured to develop a third color by being applied with third energy, the third color being different from the first color and the second color, the third energy being larger than the second energy, and wherein in the converting, the control device is configured to convert the color of the conversion dots to a color containing the third color as the conversion color.

5. The printer according to claim 2, further comprising:

a prohibitor prohibiting the color of the conversion dots from being converted to the conversion color by the control device in the converting in a case the color of the upstream dots is the same as the color of the target dots.

6. The printer according to claim 2, wherein in the converting, the control device is configured to convert the color of the upstream dots to the conversion color in a case the color of the upstream dots is a color that does not contain any of the colors developed by the plurality of color developing layers.

7. The printer according to claim 2, wherein the second energy is larger than the first energy, wherein a first timing is later than a second timing, the first timing being a timing at which heat generation of the heat generation element stops in a case the heat generation element receives a first signal pattern in the performing of the printing control, the second timing being a timing at which heat generation of the heat generation element stops in a case the heat generation element receives a second signal pattern in the performing of the printing control, the first signal pattern being the signal pattern for applying the first energy and the second energy to the thermosensitive medium, the second signal pattern being the signal pattern for applying the first energy to the thermosensitive medium in the performing of the printing control, and wherein in the converting, in a case the color of the upstream dots is the first color, the control device is configured to convert the color of the upstream dots to a color containing the first color and the second color as the conversion colors.

8. The printer according to claim 1, wherein in the converting, the control device is configured to convert the color of the conversion dots to the color of the target dots as the conversion color.

9. A printing method by a printer, the printer being configured to perform printing on a thermosensitive medium, the thermosensitive medium comprising a base material and a plurality of color developing layers that are layers stacked on the base material in a stacking direction and that develop colors in accordance with energy applied, the plurality of color developing layers comprising:

a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer comprising:

a conveyance device configured to convey the thermosensitive medium in a conveyance direction; and a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction, the printing method comprising:

obtaining pre-conversion image data;

converting the pre-conversion image data obtained in the obtainment process to post-conversion image data; and performing a printing control comprising outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device, wherein the pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively, and wherein in the converting, in a case target dots that are dots of a color containing the second color is included in the plurality of dots in the pre-conversion image data, the method comprises converting a color of conversion dots to a conversion color containing a color developed by any one of the plurality of color developing layers, the conversion dots being at least one of dots among a pair of first dots adjacent to the target dots in the sub-scanning direction, a pair of second dots adjacent to the target dots in the main-scanning direction, and four third dots adjacent to each of the pair of second dots in the sub-scanning direction.

10. The printing method according to claim 9, wherein in the converting, the method includes converting the color of the conversion dots comprising at least one dot of upstream dots printed on the thermosensitive medium by the thermal head before the target dots in the pair of first dots, the pair of second dots, and the pair of third dots printed on the thermosensitive medium by the thermal head before the target dots in the four third dots to the conversion color.

11. The printing method according to claim 10, wherein in the converting, the method includes converting the color of the conversion dots comprising the upstream dots to the conversion color.

12. The printing method according to claim 10, wherein the plurality of color developing layers further comprises a third layer disposed between the base material and the second layer in the stacking direction and configured to develop a third color by being applied with third energy, the third color being different from the first color and the second color, the third energy being larger than the second energy, and wherein in the converting, the method includes converting the color of the conversion dots to a color containing the third color as the conversion color.

13. The printing method according to claim 10, wherein in the converting, the method includes prohibiting the color of the conversion dots from being converted to the conversion color in a case the color of the upstream dots is the same as the color of the target dots.

14. The printing method according to claim 10, wherein in the converting, the method includes converting the color of the upstream dots to the conversion color in a case the color of the upstream dots is a color that does not contain any of the colors developed by the plurality of color developing layers.

15. The printing method according to claim 10, wherein the second energy is larger than the first energy, wherein a first timing is later than a second timing, the first timing being a timing at which heat generation of the heat generation element stops in a case the heat generation element receives a first signal pattern in the performing of the printing control, the second timing being a timing at which heat generation of the heat generation element stops in a case the heat generation element receives a second signal pattern in the performing of the printing control, the first signal pattern being the signal pattern for applying the first energy and the second energy to the thermosensitive medium, the second signal pattern being the signal pattern for applying the first energy to the thermosensitive medium in the performing of the printing control, and wherein in the converting, in a case the color of the upstream dots is the first color, the method includes converting the color of the upstream dots to a color containing the first color and the second color as the conversion colors.

16. The printing method according to claim 9, wherein in the converting, the method includes converting the color of the conversion dots to the color of the target dots as the conversion color.

17. A non-transitory computer-readable storage medium storing a printing program readable by a computer of a printer, the printer being configured to perform printing on a thermosensitive medium, the thermosensitive medium comprising a base material and a plurality of color developing layers that are layers stacked on the base material in a stacking direction and that develop colors in accordance with energy applied, the plurality of color developing layers comprising:

a first layer disposed at a position farthest from the base material among the plurality of color developing layers in the stacking direction and configured to develop a first color based on a first energy being applied to the thermosensitive medium; and a second layer disposed between the base material and the first layer in the stacking direction and configured to develop a second color based on a second energy being applied to the thermosensitive medium, the second color being different from the first color, the second energy being different from the first energy, the printer comprising:

a conveyance device configured to convey the thermosensitive medium in a conveyance direction; and a thermal head having a plurality of heat generation elements aligned in an arrangement direction perpendicular to the conveyance direction and configured to perform printing on the thermosensitive medium conveyed by the conveyance device by heat generation of the plurality of heat generation elements from the first layer side in the stacking direction, the printing program, when executed by the computer, causing the printer to perform operations comprising:

receiving pre-conversion image data;

converting the received pre-conversion image data to post-conversion image data; and performing a printing control comprising outputting, to each of the plurality of heat generation elements, a signal pattern for applying energy to the thermosensitive medium based on the converted post-conversion image data to cause the plurality of heat generation elements to selectively generate heat while controlling conveyance of the thermosensitive medium by the conveyance device, wherein the pre-conversion image data and the post-conversion image data respectively indicate a plurality of dots and colors corresponding to the plurality of dots, the plurality of dots being aligned in a sub-scanning direction corresponding to the conveyance direction and a main-scanning direction corresponding to the arrangement direction, respectively, and wherein in the converting, in a case target dots that are dots of a color containing the second color is included in the plurality of dots in the pre-conversion image data, the printing program, when executed by the computer, further cause the computer to perform converting a color of conversion dots to a conversion color containing a color developed by any one of the plurality of color developing layers, the conversion dots being at least one of the dots among a pair of first dots adjacent to the target dots in the sub-scanning direction, a pair of second dots adjacent to the target dots in the main-scanning direction, and four third dots adjacent to each of the pair of second dots in the sub-scanning direction.

* * * * *